US010275392B2

United States Patent
Nakashima et al.

(10) Patent No.: US 10,275,392 B2
(45) Date of Patent: Apr. 30, 2019

(54) DATA PROCESSING DEVICE

(71) Applicant: National University Corporation Nara Institute of Science and Technology, Ikoma-shi, Nara (JP)

(72) Inventors: Yasuhiko Nakashima, Ikoma (JP); Shinya Takamaeda, Ikoma (JP)

(73) Assignee: NATIONAL UNIVERSITY CORPORATION NARA INSTITUTE OF SCIENCE AND TECHNOLOGY, Nara (JP)

( * ) Notice: Subject to any disclaimer, the term of this patent is extended or adjusted under 35 U.S.C. 154(b) by 0 days.

(21) Appl. No.: 15/564,039

(22) PCT Filed: Apr. 6, 2016

(86) PCT No.: PCT/JP2016/061302
§ 371 (c)(1),
(2) Date: Oct. 3, 2017

(87) PCT Pub. No.: WO2016/163421
PCT Pub. Date: Oct. 13, 2016

(65) Prior Publication Data
US 2018/0089141 A1  Mar. 29, 2018

(30) Foreign Application Priority Data
Apr. 8, 2015  (JP) .................... 2015-079552

(51) Int. Cl.
*G06F 9/30* (2018.01)
*G06F 15/80* (2006.01)
(Continued)

(52) U.S. Cl.
CPC .......... *G06F 15/80* (2013.01); *G06F 9/30007* (2013.01); *G06F 9/30098* (2013.01);
(Continued)

(58) Field of Classification Search
None
See application file for complete search history.

(56) References Cited

U.S. PATENT DOCUMENTS

| | | | | |
|---|---|---|---|---|
| 5,179,530 A | * | 1/1993 | Genusov | G06F 9/30112 708/520 |
| 6,173,388 B1 | * | 1/2001 | Abercrombie | G06F 9/30145 345/563 |
| 6,728,862 B1 | * | 4/2004 | Wilson | G06F 9/30032 709/238 |

FOREIGN PATENT DOCUMENTS

WO    WO-2013/137459 A1    9/2013

OTHER PUBLICATIONS

Carlos Flores Fajardo et al., Buffer-Integrated-Cache: A Cost-Effective SRAM Architecture for Handheld and Embedded Platforms, 2011 48th ACM/EDAC/IEEE Design Automation Conference (DAC), Jun. 5, 2011, pp. 966-971.
(Continued)

*Primary Examiner* — William B Partridge
(74) *Attorney, Agent, or Firm* — Harness, Dickey & Pierce, P.L.C.

(57) ABSTRACT

A data processing device includes a two-dimensional structure including a plurality of stages in a vertical direction, the stages each including basic units in a horizontal direction such that the number of the basic units is equal to the number of ways. The basic units each includes a memory block having a plurality of ports, an address generator for the ports of the memory block, and a calculation unit.

7 Claims, 13 Drawing Sheets

(51) Int. Cl.
    *G06F 12/08*          (2016.01)
    *G06F 12/0811*       (2016.01)
    *G06F 12/0842*       (2016.01)
    *G06F 12/0864*       (2016.01)
    *G06F 12/0895*       (2016.01)
    *G06F 9/38*          (2018.01)

(52) U.S. Cl.
    CPC .......... *G06F 12/08* (2013.01); *G06F 12/0811* (2013.01); *G06F 12/0842* (2013.01); *G06F 12/0864* (2013.01); *G06F 12/0895* (2013.01); *G06F 9/38* (2013.01)

(56) References Cited

OTHER PUBLICATIONS

International Search Report for International Application No. PCT/JP2016/061302 dated May 24, 2016.
International Preliminary Report on Patentability dated Oct. 19, 2017.

* cited by examiner

FIG. 10

DATA PROCESSING DEVICE

TECHNICAL FIELD

The present invention relates to a data processing device for use in a computer system.

BACKGROUND ART

As a conventionally known method of configuring an accelerator in a computer system, there are a single instruction stream, multiple data stream (SIMD) method of a shared external cache type and an external accelerator method of a shared main storage type.

When a general-purpose central processing unit (CPU) sends data to an accelerator, it is only necessary to write back (flush) internal cache data to an external cache in the case of the shared external cache type. However, since an external cache memory generally has a data width close to an SIMD width, it is not possible to refer, at one time, to a large amount of data that exceeds the SIMD width. On the other hand, in the case of the shared main storage type, it is necessary to write back (flush) both internal cache data and external cache data to a main storage. This causes a cache flush time to become a large overhead.

In view of the above, there has been a proposal on a configuration provided with a buffer memory, which serves as a cache memory for a core and also as a local memory for each accelerator (see Non-Patent Literature 1 (FIG. 1)).

With this configuration, the local memory of each accelerator and the cache memory are one shared buffer memory. This leads to reduction of the above-described overhead.

CITATION LIST

Non-Patent Literature

[Non-Patent Literature 1] Carlos Flores Fajardo, Zhen Fang, Ravi Iyer, German Fabila Garcia, Seung Eun Lee, Li Zhao, Buffer-Integrated-Cache: A Cost-Effective SRAM Architecture for Handheld and Embedded Platforms, Design Automation Conference (DAC), 2011 48th ACM/EDAC/IEEE Date of Conference: 5-9 Jun. 2011 Page(s): 966-971

SUMMARY OF INVENTION

Technical Problem

Even the configuration disclosed in Non-Patent Literature 1, however, has had a limited overhead reduction. This is because in the configuration disclosed in Non-Patent Literature 1, the cache memory is provided outside each accelerator and therefore, data transfer between the accelerator and the cache memory is still required.

In view of the above problem, an object of an embodiment of the present invention is to provide a data processing device which is arranged to include a cache memory inside an accelerator so as to eliminate the need for data transfer between the accelerator and the cache memory and accordingly make it possible to reduce overhead to a larger extent.

In order to solve the above problems, a data processing device in accordance with an embodiment of the present invention is a data processing device including a two-dimensional structure including basic units in a plurality of stages aligned in a vertical direction, each of the stages including basic units whose number corresponds to a number of ways such that the basic units are aligned in a horizontal direction in each of the stages, the basic units in the plurality of stages including, respectively: memory blocks each having a plurality of ports; address generators each corresponding to ports of a corresponding one of the memory blocks; calculation units; groups of data buses; calculation bus and switch groups; memory bus and switch groups; and end registers, in each one of the stages, the groups of data buses simultaneously taking pluralities of words from the memory blocks such that a number of the pluralities of words is equal to a number obtained by multiplying a number of a plurality of words by a number of ways, in each one of the stages, the calculation bus and switch groups simultaneously supplying the pluralities of words to the calculation units, in each one of the stages, the memory bus and switch groups writing, to the memory blocks, respective outputs from the calculation units, the memory blocks belonging to an identical one of the ways being connected with write buses and read buses which are connected to an external memory via one bus, (a) the data processing device concurrently (i) writing a content of the external memory to the memory blocks belonging to an identical one of the ways and (ii) reading out contents of the memory blocks belonging to the identical one of the ways into the calculation units, or (b) the data processing device concurrently (i) writing contents of the calculation units into the memory blocks belonging to an identical one of the ways and (ii) reading out the contents of the memory blocks belonging to the identical one of the ways into the external memory, and in a case where a content of each of the memory blocks is read out by using a corresponding one of the address generators, the data processing device simultaneously reading out a plurality of words from the each of the memory blocks and at the same time, writing a value to a corresponding one of the end registers.

Advantageous Effects of Invention

An embodiment of the present invention advantageously makes it possible to reduce overhead to a larger extent.

Figure 3:
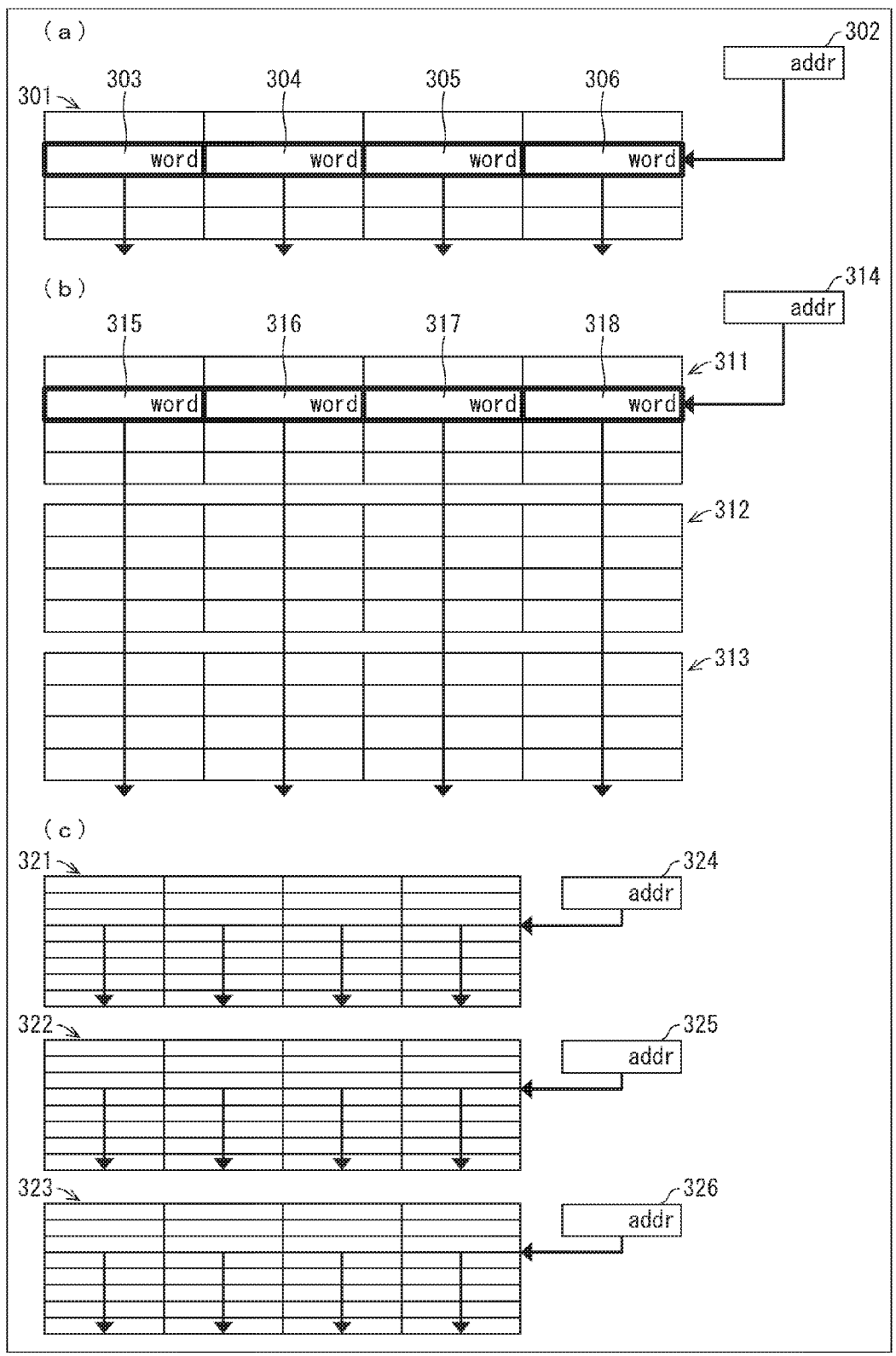

(a), (b) and (c) of FIG. 3 are diagrams illustrating a functional requirement 1 to be achieved by an embodiment of the present invention.

Figure 4:
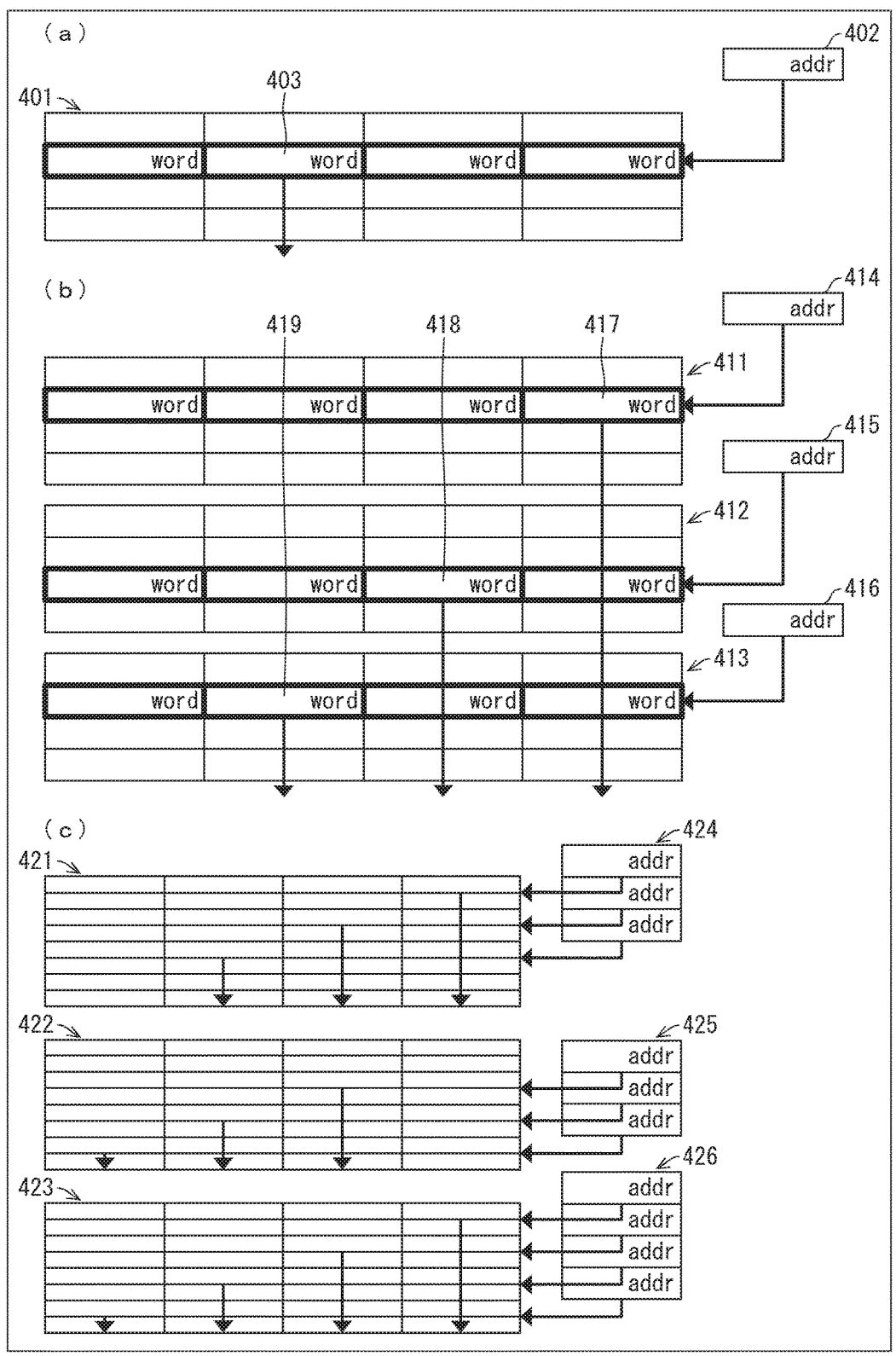

(a), (b) and (c) of FIG. 4 are diagrams illustrating a functional requirement 2 to be achieved by an embodiment of the present invention.

Figure 5:
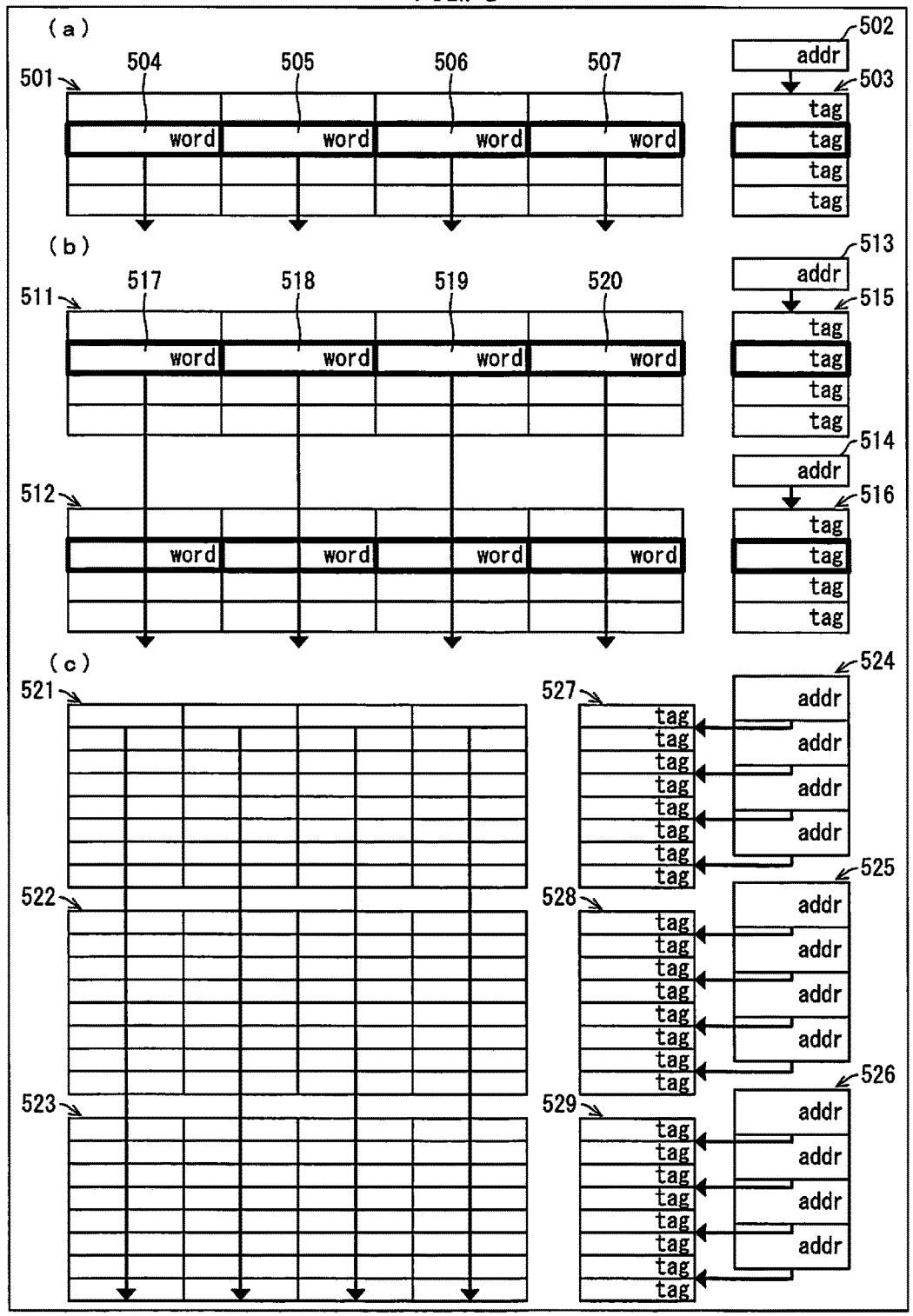

(a), (b) and (c) of FIG. 5 are diagrams illustrating a functional requirement 3 to be achieved by an embodiment of the present invention.

Figure 6:
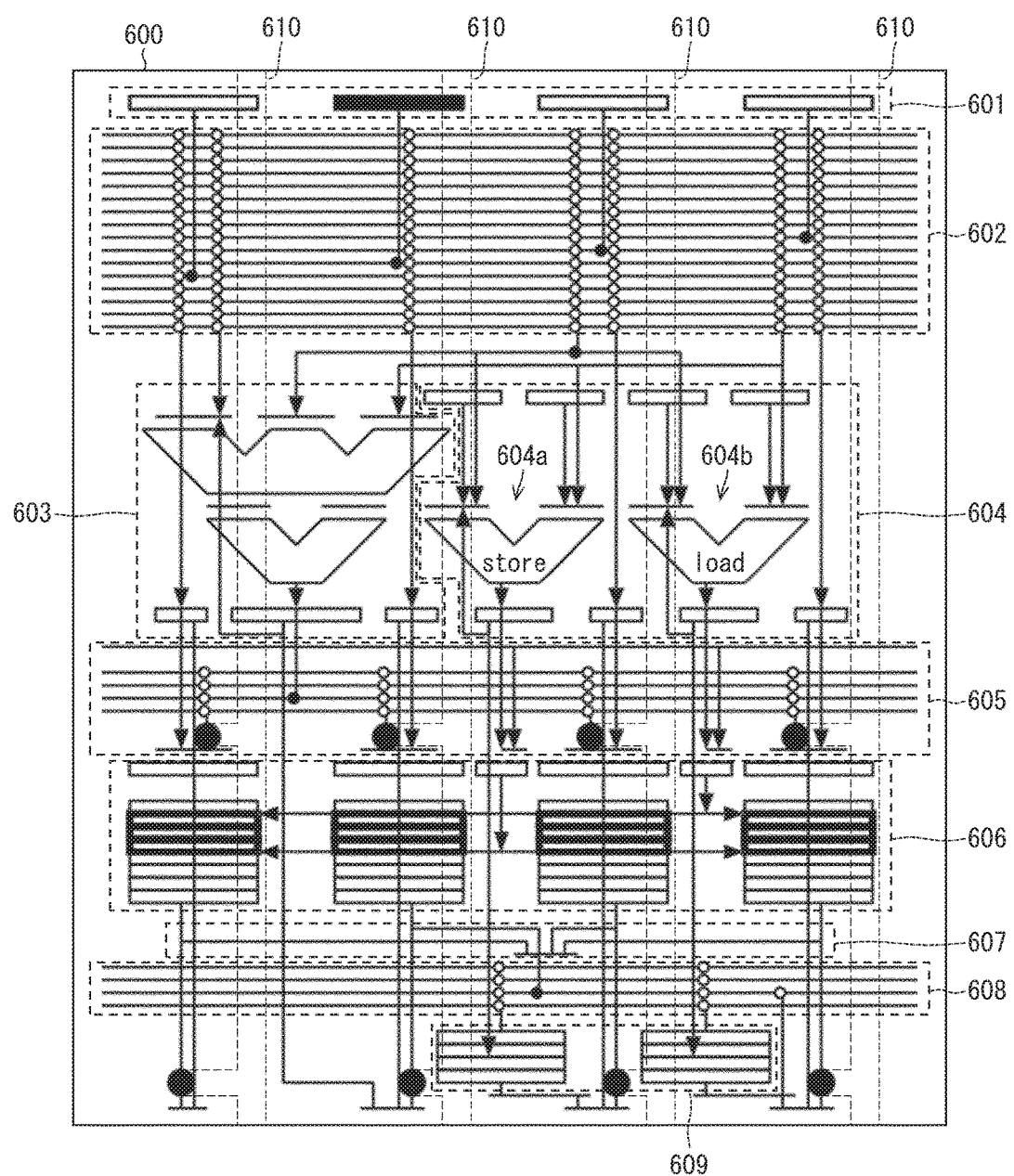

FIG. 6 is a circuit diagram illustrating a basic unit that makes up a data processing device in accordance with an embodiment of the present invention.

Figure 7:
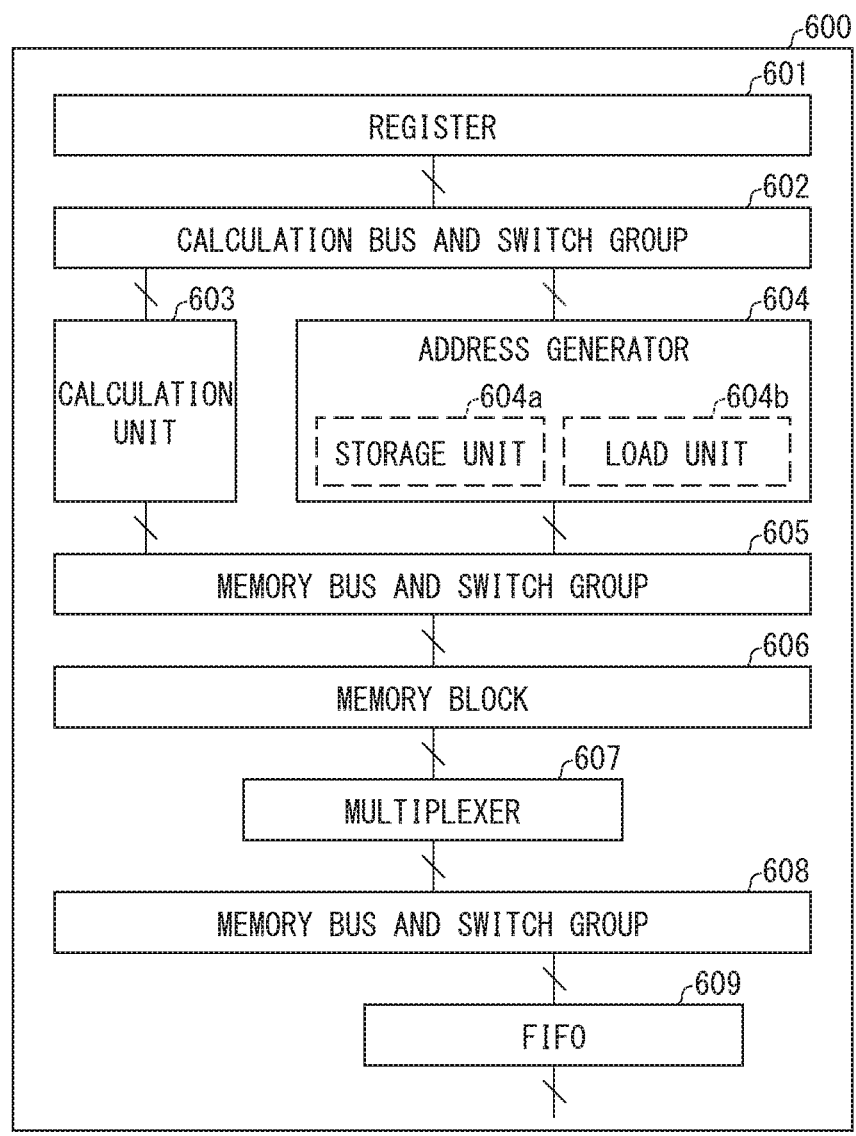

FIG. 7 is a functional block diagram illustrating the basic unit illustrated in FIG. 6.

Figure 8:
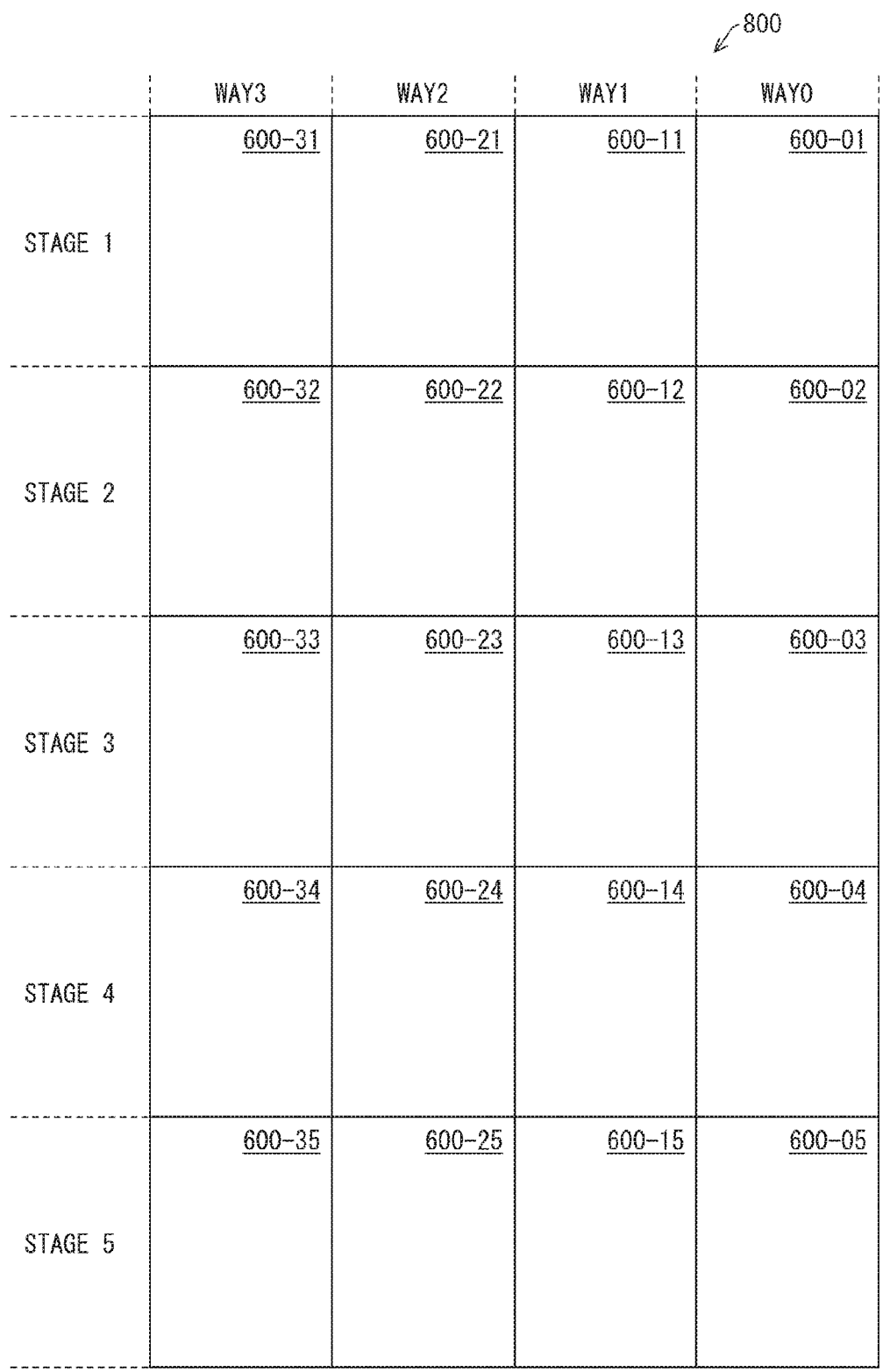

FIG. 8 is a block diagram illustrating a schematic configuration of the data processing device.

Figure 9:
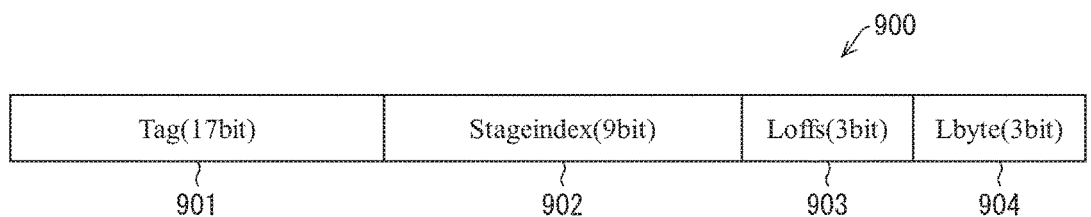

FIG. 9 is a pattern diagram illustrating a structure of an address for use in the data processing device.

Figure 10:
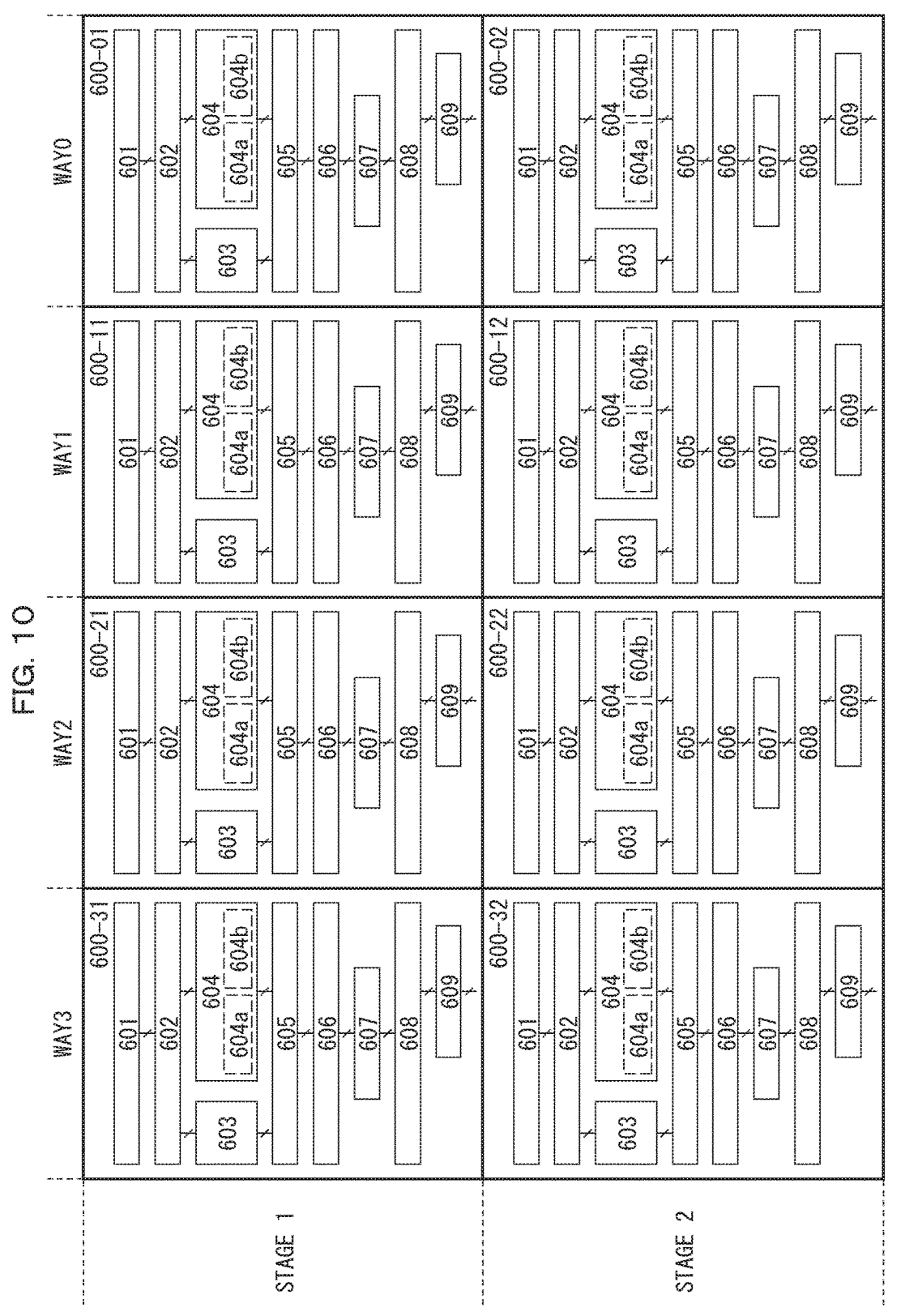

FIG. 10 is a block diagram illustrating a schematic configuration of the data processing device.

Figure 11:
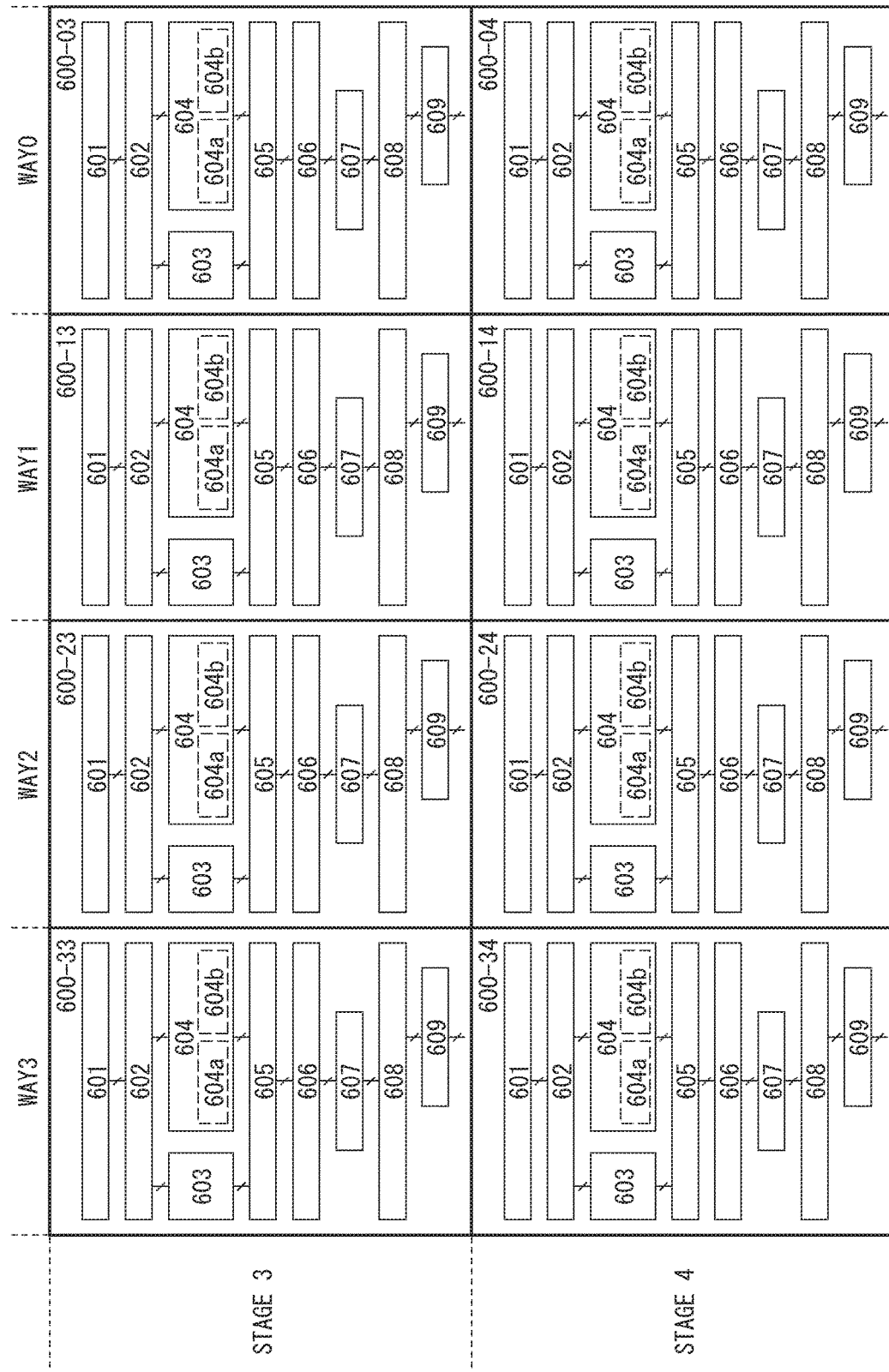

FIG. 11 is a block diagram illustrating a schematic configuration of the data processing device.

Figure 12:
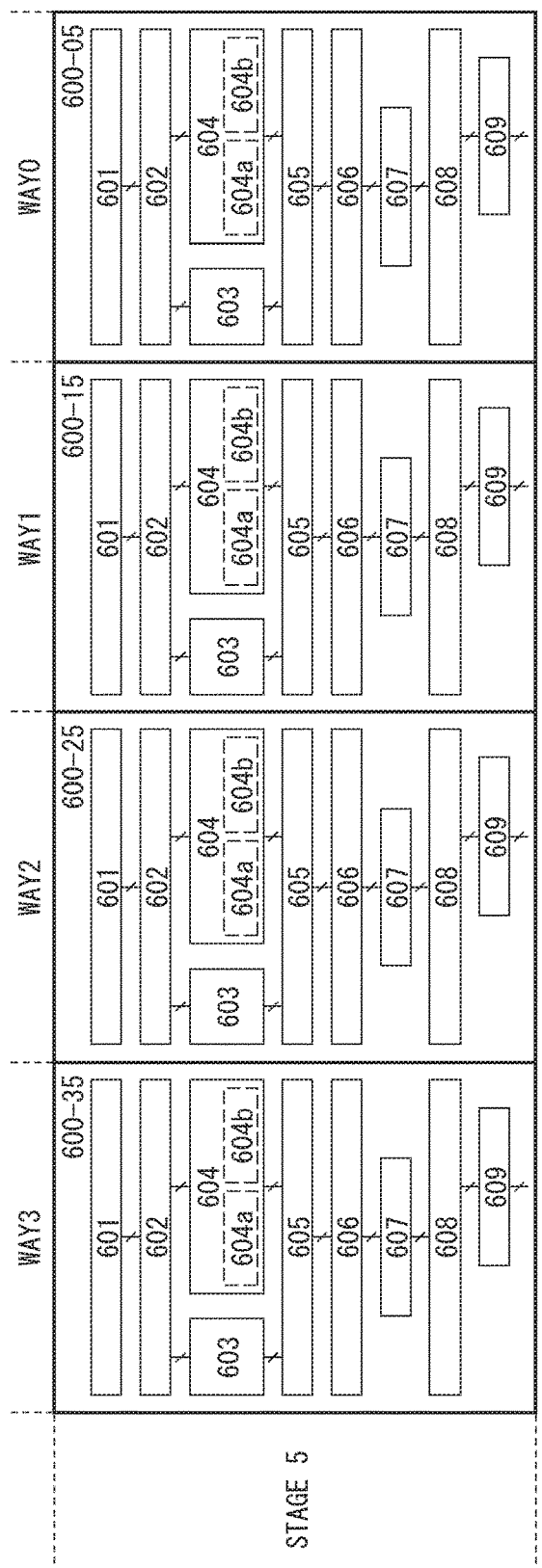

FIG. 12 is a block diagram illustrating a schematic configuration of the data processing device.

Figure 13:
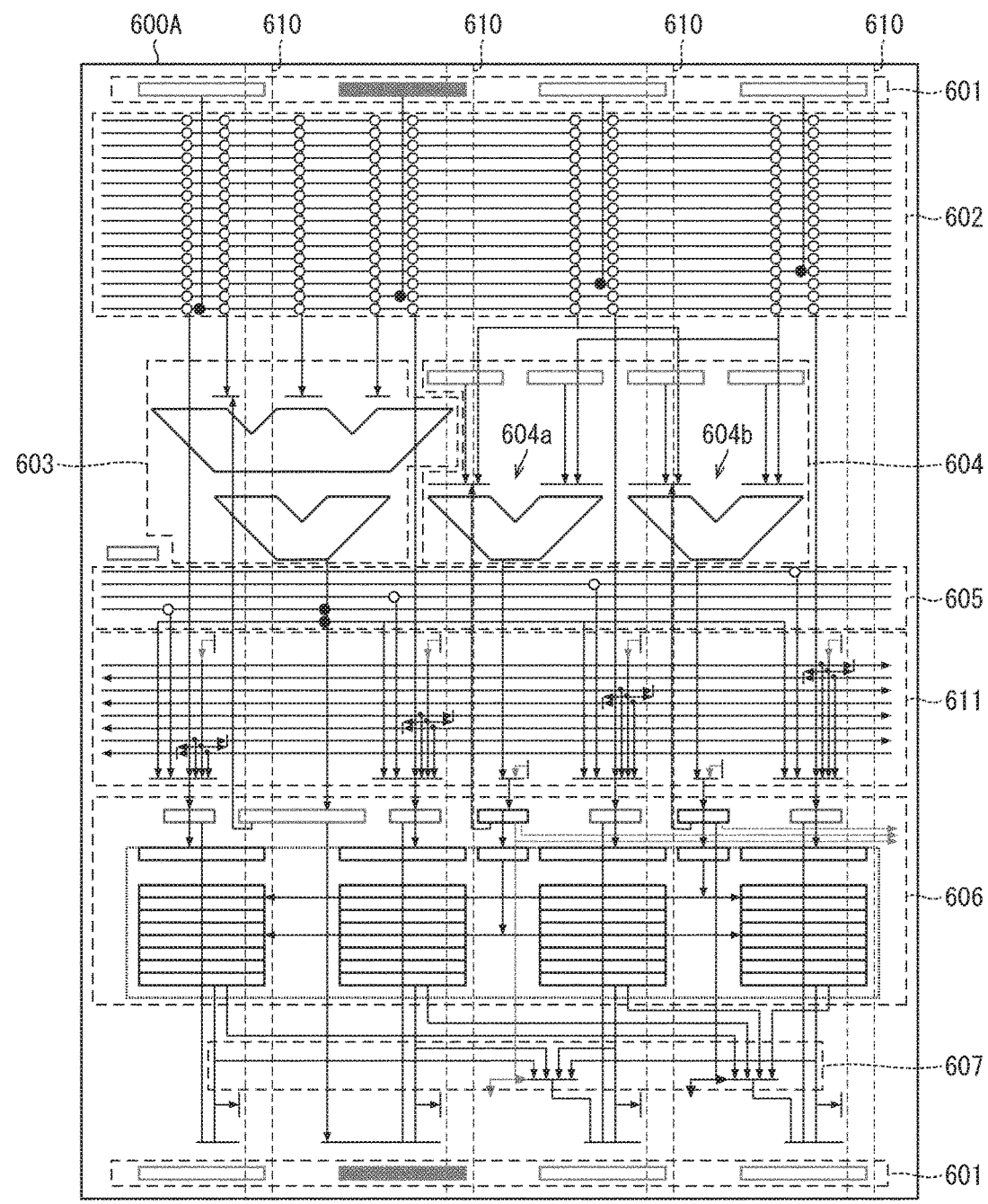

FIG. 13 is a circuit diagram illustrating another basic unit which makes up a data processing device in accordance with an embodiment of the present invention.

DESCRIPTION OF EMBODIMENTS

The following description will discuss embodiments of the present invention in detail. The following will first provides a basic description in regard to a technique on which the embodiments of the present invention are based and problems of the technique, and then, will further describe suitable embodiments of the present invention with reference to drawings.

[Basic Description]

Since it is, in general, difficult to cause a calculation accelerator to run an operating system (OS) by itself, cooperation with a general-purpose CPU is essential in construction of a practical system. When a calculation accelerator is connected to a general-purpose CPU, cooperation with a cache memory is important. Accordingly, a short vector (SIMD) method which can directly use cache lines is generally employed. In a case where a larger-scale accelerator is required, an operation mechanism similarly based on the SIMD method is connected to a secondary cache (L2 cache). In a case where a long vector method is employed to further increase the scale of a larger-scale accelerator, an operation mechanism is connected to a main storage (main memory) or to another memory space which is capable of carrying out direct memory access (DMA) transfer to/from the main storage.

In irregular processing typically including graph processing, it is not possible to obtain a uniform data width. Accordingly, an advantageous effect of the SIMD method is limited. If a high data dependency is utilized in the case of irregular processing, obtainment of an advantageous effect of a CGRA (coarse-grained reconfigurable array) can be expected, instead of an advantageous effect of the SIMD method. However, in general use of a CGRA, an address range is set for each of internal memory blocks and reference to each memory block is sequentially made. Accordingly, it is difficult to make such a CGRA coexist with conventional caches for which block locations are each uniquely determined by a corresponding address. Further, though seamless connection between a CGRA and a main storage and integrated pipeline formation are important for large-scale graph processing which cannot be accommodated in internal memories, it is also difficult to allow for coexistence of a very long main storage latency and a CGRA in which simultaneous calculations are carried out every cycle.

Due to the above difficulties, connection via a main storage is generally an only way to connect a general-purpose CPU with an accelerator that is intended to accelerate graph processing. Accordingly, as described in the "Background Art" of the present specification, overhead such as cache flush overhead occurs every time an accelerator is used.

In light of the above, the inventors of the present application have made diligent studies for providing a highly-efficient calculator capable of processing big data, for example, high-performance calculation processing such as stencil computation processing, graph processing, and the like. As a result, the inventors have found that ultrafast processing which has not been possible so far can be achieved by using CGRA internal memory blocks as (1) SIMD buffers, (2) stencil memories, (3) caches and (4) main storage latency-hiding buffers. The inventors thereby have accomplished the present invention.

Figure 1:
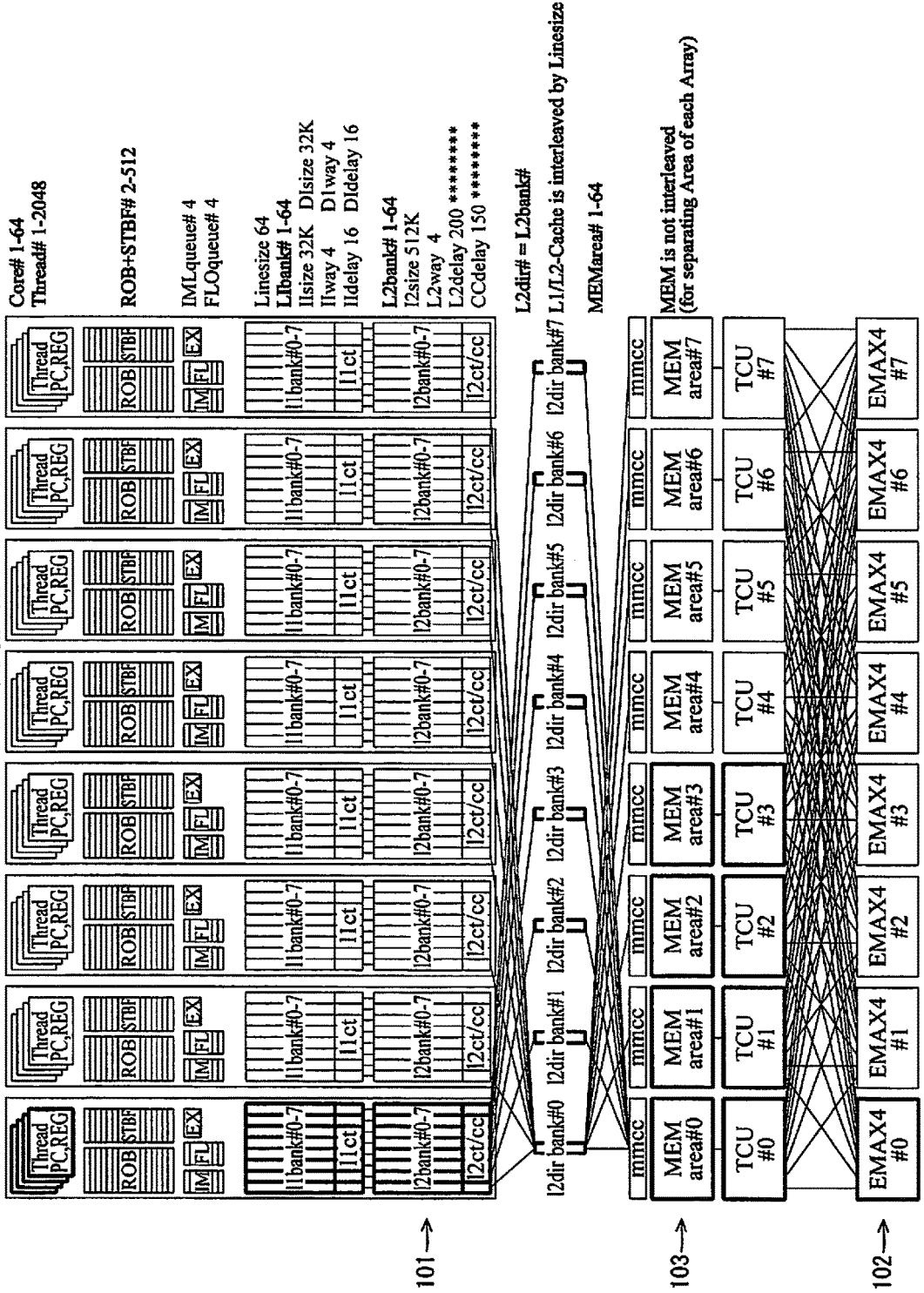
FIG. 1 is a block diagram illustrating a configuration of a conventional computer system.
Figure 2:
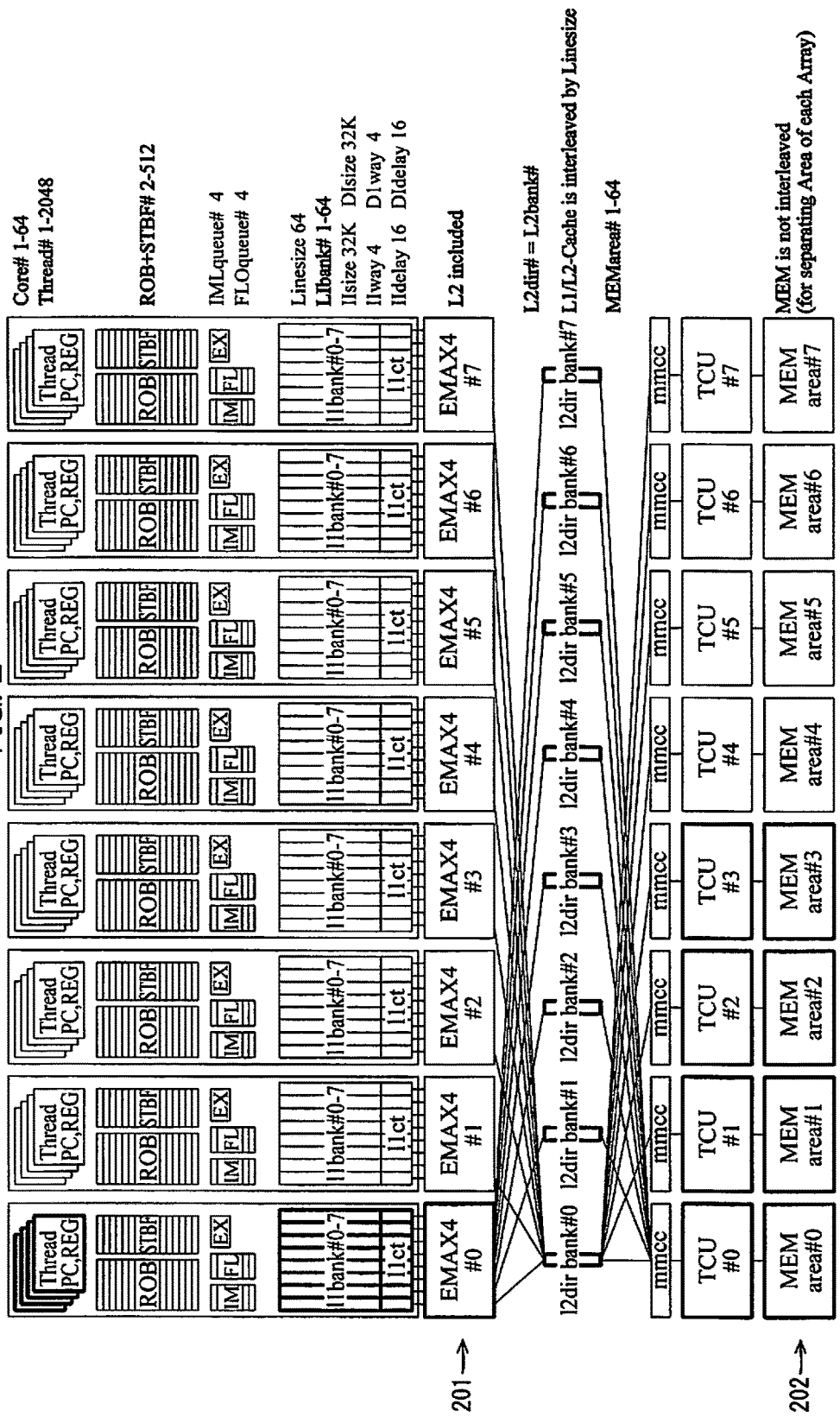
FIG. 2 is a block diagram illustrating a configuration of a computer system in accordance with an embodiment of the present invention.

FIG. 1 is a block diagram illustrating a configuration of a conventional computer system. FIG. 2 is a block diagram illustrating a configuration of a computer system in accordance with an embodiment of the present invention. As illustrated in FIG. 1, in a configuration of a conventional computer system, secondary caches (L2 caches) 101 are provided outside CGRA internal memory blocks (accelerator) 102, respectively, and all internal memories of the CGRA internal memory blocks 102 are each in a separate space from a space in which a main storage 103 of a general-purpose CPU is provided. Accordingly, it has been necessary for programmers to frequently use cache flush for keeping value coherence between all the internal memories of the CGRA internal memory blocks 102 and the secondary caches 101.

On the other hand, as illustrated in FIG. 2, in a configuration of a computer system in accordance with an embodiment of the present invention, secondary caches are each provided inside a CGRA internal memory block 201. The secondary caches each serve as a secondary cache for a general-purpose CPU and as an internal memory for the CGRA internal memory block 201. In other words, the secondary caches are each shared by the general-purpose CPU and the CGRA internal memory block 201. As a result, it becomes unnecessary for a programmer to intentionally make an explicit data transfer between the internal memories of the CGRA internal memory blocks 201 and main storages 202. Accordingly, when an internal cache is flushed, only a CGRA internal memory block 201 needs to be flushed. This eliminates the need for writing data back to a corresponding main storage 202. Further, simultaneous reference to data in many CGRA internal memory blocks becomes possible. This eliminates limitation in calculation capability due to a bus width of an external cache in the computer system unlike in a conventional system of the shared external cache type.

As described above, an embodiment of the present invention relates to a method of configuring an accelerator in a computer system, the accelerator having a function of sharing data with a general-purpose CPU and eliminating the need for cache flush of an entire internal cache. In order to have such a data sharing function, an embodiment of the present invention is required to achieve the following functional requirements 1 to 4.

(Functional Requirement 1)

FIG. 3 is a diagram illustrating a functional requirement 1 which is achieved by an embodiment of the present invention. The functional requirement 1 is being capable of simultaneously reading out a plurality of consecutive words from each of blocks every cycle. In (a) of FIG. 3, a continuous region 301 corresponds to one block. An address 302 increases by 4 words every cycle. Pieces of data 303, 304, 305, and 306, that is, 4 words are simultaneously read out every cycle from the continuous region 301.

(b) of FIG. 3 illustrates a configuration in which a capacity is increased by joining together a plurality of blocks each corresponding to the one block illustrated in (a) of FIG. 3. In (b) of FIG. 3, blocks (continuous regions) 311, 312, and 313 are joined together. An address 314 increases by 4 words every cycle and pieces of data 315, 316, 317, and 318, that is, 4 words are simultaneously read out every cycle from the block 311. Similarly, pieces of data are read out from each of blocks 312 and 313 as with the block 311.

(c) of FIG. 3 illustrates a configuration in which a plurality of stages each made up of a plurality of blocks illustrated in (b) of FIG. 3 are joined together. In (c) of FIG. 3, stages 321, 322, and 323 are joined together, each of which stages 321, 322, and 323 includes a plurality of blocks that are joined together. An address 324 increases by 4 words every cycle, so that pieces of data, that is, 4 words are simultaneously read out every cycle from one of the blocks in the stage 321. Similarly, addresses 325 and 326 each increase by 4 words every cycle, so that pieces of data, that is, 4 words are simultaneously read out every cycle from one of the blocks in each of the stages 322 and 323 as with the block 321. In this configuration, different addresses supplied correspond to respective stages, and the number of the different addresses corresponds to the number of the stages. Accordingly, in such a configuration, the number of sets of a plurality of words which can be read out every cycle corresponds to the number of stages.

The configuration illustrated in FIG. 3 is suitable for further enhancement of performance by parallel execution of SIMD or graph processing.

Note that: in the case of SIMD processing, the 4 words correspond to consecutive 4 elements in an array and read data will be calculated simultaneously in response to a subsequent SIMD command; and in the case of graph processing, the 4 words correspond to respective members of a structure array and handling of read data depends on each word. That is, graph processing is different from SIMD processing in that a complex command accompanied by conditional judgment etc. is used in graph processing, in place of a subsequent command in SIMD processing.

The functional requirement 1 achieves the following data supply capability in SIMD computation.

Number of addresses: Total number of stages

Each data width: 4 words

Note that each of blocks 311, 312, and 313 illustrated in (b) of FIG. 3 corresponds to each way illustrated in FIG. 8 described later.

(Functional Requirement 2)

FIG. 4 is a diagram illustrating a functional requirement 2 which is achieved by an embodiment of the present invention. The functional requirement 2 is being capable of simultaneously reading out every cycle a plurality of words from a plurality of blocks such that a single word is consecutively read out from each of the blocks. In (a) of FIG. 4, a continuous region 401 corresponds to one block. An address 402 increases by 1 word every cycle, and data 403 of one word is read out every cycle from the continuous region 401.

(b) of FIG. 4 illustrates a configuration having an increased number of spaces from which data can be simultaneously read out by providing a plurality of blocks each being the one block illustrated in (a) of FIG. 4. The functional requirement 2 is different from the functional requirement 1 in that whereas a plurality of words are simultaneously read out from a block associated with each of consecutive addresses in the functional requirement 1, a single word is simultaneously read out from each of a block associated with each of different consecutive addresses in the functional requirement 2. In (b) of FIG. 4, blocks (continuous regions) 411, 412, and 413 are provided. Then, an address 414 increases by 1 word every cycle, so that data 417 of 1 word is read out every cycle from the block 411. Moreover, an address 415 increases by 1 word every cycle, so that data 418 of 1 word is read out every cycle from the block 412. Further, an address 416 increases by 1 word every cycle, so that data 419 of one word is read out every cycle from the block 413.

(c) of FIG. 4 illustrates a configuration in which a plurality of stages each made up of a plurality of blocks each illustrated in (b) of FIG. 4 are joined together. In this configuration, the number of different addresses to be supplied amounts to the number of blocks in each target stage×the number of stages. Then, in this configuration, a single word can be read out every cycle from each of all the blocks, that is, the number of words read out every cycle is the total number of blocks. This configuration is suitable for further enhancement of performance by parallel execution of high-order stencil computation.

In (c) of FIG. 4, stages 421, 422, and 423 each including a plurality of blocks are joined together. In the stage 421, a plurality of blocks is provided. Each address in an address group 424 increases by 1 word every cycle, so that data of one word is read out every cycle from each block. In the stage 422, a plurality of blocks is provided. Each address in an address group 425 increases by 1 word every cycle, so that data of one word is read out every cycle from each block. In the stage 423, a plurality of blocks is provided. Each address in an address group 426 increases by 1 word every cycle, so that data of one word is read out every cycle from each block.

The functional requirement 2 achieves the following data supply capability in stencil computation.

Number of addresses: Total number of blocks (the number of stages×the number of blocks included in each stage)

Each data width: 1 word

Note that each of blocks 411, 412, and 413 illustrated in (b) of FIG. 4 corresponds to each way illustrated in FIG. 8 described later.

(Functional Requirement 3)

FIG. 5 is a diagram illustrating a functional requirement 3 which is achieved by an embodiment of the present invention. The functional requirement 3 is being capable of carrying out (i) pipeline-search of all blocks and (ii) read and transfer of appropriate lines. In (a) of FIG. 5, a continuous region 501 corresponds to one block. The continuous region 501 is a configuration including a plurality of cache lines, and an address 502 is provided at the head of the plurality of cache lines. The functional requirement 3, unlike the functional requirements 1 and 2, is arranged such that after cache lines are identified by a portion of an address of the cache lines, the high-order bit of the address is compared with individual tag information 503 provided to each cache line and then, pieces of data 504, 505, 506, and 507 are read out from only a cache line(s) having the individual tag information 503 that matches in content with the high-order bit of the address.

(b) of FIG. 5 illustrates a multiple-way configuration that is intended to prevent cache line collisions as with general caches. In (b) of FIG. 5, a plurality of blocks each corresponding to the one block illustrated in (a) of FIG. 5 are provided, so that search of all ways is carried out simultaneously and data is read out from only cache lines each of which has a matched individual tag. In (b) of FIG. 5, blocks 511 and 512 are provided. After cache lines of respective ways are identified by respective portions of addresses 513 and 514, the high-order bits of the addresses 513 and 514 are compared with pieces of individual tag information 515 and 516 provided to the cache lines, respectively. Then, pieces of data 517, 518, 519, and 520 are read out from only cache lines each having the pieces of individual tag information 515 and 516 that match with the high-order bits of the addresses 513 and 514, respectively.

(c) of FIG. 5 illustrates a configuration in which stages each made up of a plurality of blocks (a plurality of ways) illustrated in (b) of FIG. 5 are joined together. In the configuration illustrated in (c) of FIG. 5, spaces whose number amounts to the number of blocks in stages×the number of stages can be used as a 4-way set associative cache.

In (c) of FIG. 5, stages 521, 522, and 523 each including a plurality of blocks are joined together. In the stage 521, after cache lines of ways are identified by portions of addresses 524, respectively, the high-order bit of each of the addresses is compared with individual tag information 527 provided to each cache line. Then, pieces of data are read out from only cache lines each having individual tag information that matches in content with the high-order bit of the address used for comparison. In the stage 522, after cache lines of ways are identified by portions of addresses 525, respectively, the high-order bit of each of the addresses is compared with individual tag information 528 provided to each cache line. Then, pieces of data are read out from only cache lines each having individual tag information that matches in content with the high-order bit of the address used for comparison. In the stage 523, after cache lines of ways are identified by portions of addresses 526, respectively, the high-order bit of each of the addresses is compared with individual tag information 529 provided to each cache line. Then, pieces of data are read out from only cache lines each having individual tag information that matches in content with the high-order bit of the address used for comparison.

The functional requirement 3 achieves the following data supply capability in a case where cashes are used.

The number of addresses: 1 (pipeline operation)
Each data width: 4 words (pipeline operation)

Note that the blocks 511 and 512 illustrated in (b) of FIG. 5 correspond to ways illustrated in FIG. 8, respectively.

(Functional Requirement 4)

For the above-described graph processing, in addition to the functional requirement 1, it is necessary to be able to use each block for hiding a delay time at the time when reference to a main storage is made. The functional requirement 4 corresponds to this delay time absorbing mechanism. The functional requirement 4 will be described later in Embodiment 4 described later.

(Sum-Up of Functional Requirements 1 to 4)

An embodiment of the present invention is intended to efficiently and concurrently achieve, on a single hardware device, the functional requirements 1 and 2 related to memory configurations suitable for an accelerator (data processing device) and the functional requirement 3 related to a memory configuration suitable for caches.

A method of managing stage locations is important for achieving all the functional requirements 1, 2 and 3 without decreasing performance and function levels. In the functional requirements 1 and 2, it is only necessary to provide necessary data in advance in a stage specified by software and to be able to write and read to/from a memory space closed within the stage.

However, in the functional requirement 3, it is necessary (i) to identify the location of a memory block by using a portion of an address, (ii) moreover, to identify a relative location in the memory block by using another portion of the address, and (iii) in addition, to verify, by comparison with an individual tag, whether a target cache line correctly corresponds to a reference address. If the functional requirement 3 is arranged by a fully associative configuration, it is logically possible to associate a cache line with any desired stage location. In the fully associative configuration, however, since the total amount of internal memories is roughly not less than that of secondary caches, employing a conventional fully associative system is not practical due to a too large number of cache lines.

In view of the above, an embodiment of the present invention allows software to explicitly specify the location of a memory block for achieving the functional requirements 1 and 2, and in addition provides a substantially fully associative cache by pipeline processing for achieving the functional requirement 3. In a case where a general-purpose CPU pre-processes data and transfers the data to a CGRA-type accelerator and in a case where the data having undergone processing by the CGRA-type accelerator is subsequently used by the general-purpose CPU, data sharing is necessary. An embodiment of the present invention can increase the speed of processing by making it possible to share data without need for an extensive cache flush.

Basic Configuration in Accordance with Embodiment of the Present Invention

The following description will discuss a basic configuration in accordance with an embodiment of the present invention, with reference to FIGS. 6, 7 and 8.

FIG. 6 is a circuit diagram illustrating a basic unit that makes up a data processing device in accordance with an embodiment of the present invention. FIG. 7 is a functional block diagram illustrating the basic unit illustrated in FIG. 6. FIG. 8 is a block diagram illustrating a schematic configuration of the data processing device in accordance with an embodiment of the present invention.

As illustrated in FIGS. 6 and 7, a basic unit 600 makes up the data processing device in accordance with an embodiment of the present invention. This basic unit 600 includes a register 601, a calculation bus and switch group 602, a calculation unit 603, an address generator 604 including a storage unit 604a and a load unit 604b, a memory bus and switch group 605, a memory block 606, a multiplexer 607, a memory bus and switch group 608, and a first in, first out (FIFO) 609. Note that the calculation bus and switch group 602, the memory bus and switch group 605, and the memory bus and switch group 608 each connect basic units 600 to each other which are provided in one stage so as to be adjacent to each other in a horizontal direction. In the present specification, for convenience, portions of the calculation bus and switch group 602 or the like each connecting each basic unit 600 with another basic unit 600 are assumed to be included in each basic unit 600.

The register 601 (end register) is a register to which data outputted from a basic unit of a preceding stage is written. Note that though the register 601 is provided on an input side of the basic unit 600 in FIGS. 6 and 7, the register 601 may be provided on an output side of the basic unit 600. In other words, the register 601 serves as both of respective registers provided in two different basic units (a basic unit of a current stage and a basic unit of a preceding or next stage) that are adjacent to each other in a vertical direction, one of which respective registers is a register to be provided on an output side of a preceding basic unit of the two basic units and the other of which respective registers is a register to be provided on an input side of a basic unit following the preceding basic unit. In an embodiment of the present invention, what is called a basic unit is a unit in which the register 601 is provided on an input side thereof, as illustrated in FIGS. 6 and 7.

The calculation bus and switch group 602 supplies, to the calculation unit 603, words read out from the memory block 606. The calculation unit 603 carries out calculation by using the words supplied from the calculation bus and switch group 602.

The address generator 604 generates an address for use in reading/writing data from/to the memory block 606. The memory bus and switch group 605 writes a calculation result obtained by the calculation unit 603 to the memory block 606, in accordance with an address generated by the address generator 604.

As described above, the memory block 606 serves both as a cache memory and a local memory of an accelerator. The multiplexer 607 aggregates words read out from the memory block 606. The memory bus and switch group 608 supplies, to the FIFO 609, the words aggregated by the multiplexer 608. The FIFO 609 puts out such words in the order in which such words are written to the FIFO 609.

Note that as illustrated in FIG. 6, the basic unit 600 is provided with a data bus 610 for transferring (a) data which has been read out from the memory block 606 and a main memory (illustration omitted) and (b) data to be written to the memory block 606 and the main memory.

As illustrated in FIG. 8, in a data processing device 800 in accordance with an embodiment of the present invention, basic units 600 illustrated in FIGS. 6 and 7 are provided in a matrix arrangement such that a two-dimensional structure is formed by a plurality of stages provided along a vertical direction, each of which stages includes, along the horizontal direction, basic units 600 whose number corresponds to the number of ways.

Note that in FIG. 8, a way and a stage to which each basic unit 600 belongs are denoted by reference signs designated to each basic unit. For example, in regard to a basic unit 600-01, "0" of "01" in the reference sign"600-01" indicates that the basic unit 600-01 belongs to a way 0 and "1" of "01" indicates that the basic unit 600-01 belongs to a stage 1. Similarly, in the case of a basic unit 600-12, "1" of "12" in the reference sign"600-12" indicates that the basic unit 600-12 belongs to a way 1 and "2" of "12" indicates that the basic unit 600-12 belongs to a stage 2.

The data processing device 800 includes, at the top of the data processing device 800, an interface for requesting reference to a memory block 606 in a case where a cache miss occurs in the general-purpose CPU. The memory block 606 is a cache (L2 cache) in the data processing device 800. The data processing device 800 further includes, at the bottom of the data processing device 800, an interface for requesting reference to a lower-level storage device (main memory) in a case where requested data is also absent in the memory block 606.

The basic unit 600 includes, as described above, the address generator 604 which includes a write-only storage unit 604a and a read-only load unit 604b, so that reading and writing can be concurrently carried out. In the memory block 606, 1 cache line is made up of consecutive 8 words such that words (8 bytes in the present example) are provided from right to left in the order of address increase. In a case where the basic unit 600 is configured to include a set of 512 cash lines, the basic unit 600 has a capacity of 32 KB.

Each stage is made up of 4 basic units which form way 0, way 1, way 2, and way 3 in the order from left to right, respectively. A main storage (main memory) is connected to each of the 4 ways, so that data transfer between the main storage and each of different ways can be simultaneously carried out.

There are two ways in which data is read out from the memory block 606. One way is to read out 4 words simultaneously from the memory block 606 and store the 4 words in a register 601 of a basic unit 600 of a next stage. The other way is to read out 1 word from the memory block 606, and store the 1 word in the above-described register 601 of the basic unit 600 of the next stage and at the same time, write the 1 word to the FIFO 609 of the current stage. Either one of these ways is selected. The former corresponds to the functional requirement 1 and the latter corresponds to the functional requirement 2.

The following description will discuss behaviors in 4 kinds of calculations including (1) SIMD computation, (2) stencil computation, (3) large-capacity caching, and (4) graph processing, which correspond to the above-described functional requirements 1 to 4, respectively. The features of an embodiment of the present invention are in that (i) each of 4 kinds of reference methods can be optimized and (b) data transfer for data switching can be minimized.

The following will describe operations of the data processing device 800, with reference to FIGS. 9 to 12. FIG. 9 is a pattern diagram illustrating a structure of an address 900 for use in the data processing device 800. As illustrated in FIG. 9, the address 900 is made up of Tag 901, Stageindex 902, Loffs 903, and Lbyte 904. FIGS. 10 to 12 are each an enlarged view of FIG. 8.

(Embodiment 1): In the Case of SIMD Computation

With reference to FIGS. 9 to 12, the following will discuss an operation of the data processing device 800 in SIMD computation.

In FIG. 10, in a stage 1, an array B is mapped to a basic unit 600-21 of a way 2, an array C is mapped to a basic unit 600-11 of a way 1, and an array D is mapped to a basic unit 600-01 of a way 0. Then, 3 quadruple width load instructions are successively executed by a load unit 604b of the basic unit 600-21, a load unit 604b of the basic unit 600-11 and a load unit 604b of the basic unit 600-01.

As a result of such successive execution of the load instructions, 4 sets of elements B, C, and D are each inputted into a calculation unit 603 in a basic unit 600-32 of the way 3, a calculation unit 603 in a basic unit 600-22 of the way 2, a calculation unit 603 in a basic unit 600-12 of the way 1, and a calculation unit 603 in a basic unit 600-02 of the way 0 in stage 2. Then, a calculation result is stored in a memory block 606 in the basic unit 600-32 in the way 3.

Simultaneously, for preparation of next successive execution, data is pre-fetched in the stage 2 from the main storage (main memory) into a memory block 606 in the basic unit 600-22 of the way 2, a memory block 606 in the basic unit 600-12 of the way 1, and a memory block 606 in the basic unit 600-02 of the way 0 while a result of the preceding execution stored in a memory block 606 of a basic unit 600-31 of the way 3 in the stage 1 is written back to the main storage.

In this execution model, instruction mapping is shifted downward stage by stage, and the data pre-fetched is used in a next stage. Though there is a drawback that successive execution may be intermittently carried out due to a capacity limitation of a memory block, there is no need for adjusting the difference in speed between writing and reading to/from the memory block during the execution.

On the other hand, with reference to FIGS. 11 and 12, the following describes stages 4 and 5 so as to discuss a method which does not require shift of instruction mapping. In the stage 4, while the content of the main storage is being supplied to a memory block 606 in a basic unit 600-24 of the way 2, to a memory block 606 in a basic unit 600-14 of the way 1, and to a memory block 606 in a basic unit 600-04 of the way 0, the content of each of the memory blocks 606 is read out. Further, in the stage 5, while respective calculation results of a calculation unit 603 in a basic unit 600-35 of the way 3, a calculation unit 603 in a basic unit 600-25 of the way 2, a calculation unit 603 in a basic unit 600-15 of the way 1, and a calculation unit 603 in a basic unit 600-05 of the way 0 are being stored in a memory block 606 in the basic unit 600-35 of the way 3, data is written back to the main storage from this memory block 606.

An ideal state is a state in which all data buses 610 connected to respective ways are in operation. Though it is necessary to adjust the difference in speed between writing and reading to/from each of the memory blocks 606, the drawback that successive execution is intermittently carried out does not occur.

(Embodiment 2): In the Case of Stencil Computation

With reference to FIGS. 9 to 12, the following discusses an operation of a data processing device 800 in stencil computation. In a stage 1, each data of one word read out from a memory block 606 in a basic unit 600-01 of a way 0 is sent to an FIFO 609 in basic a unit 600-21 of a way 2 and to a FIFO 609 in a basic unit 600-11 of a way 1. In a stage 2, data of six words is supplied to a calculation unit 603 in a basic unit 600-22 of the way 2 and to a calculation unit 603 in a basic unit 600-12 of the way 1.

In the stage 2, each data of one word read out from a memory block 606 in a basic unit 600-02 of the way 0 is sent to a FIFO 609 in the basic unit 600-22 of the way 2 and to a FIFO 609 in the basic unit 600-12 of the way 1. In a stage 3, data of six words is supplied to a calculation unit 603 in a basic unit 600-23 of the way 2 and to a calculation unit 603 in a basic unit 600-13 of the way 1.

In the stage 3, each data of one word read out from a memory block 606 in a basic unit 600-03 of the way 0 is sent to a FIFO 609 in the basic unit 600-23 of the way 2 and to a FIFO 609 in the basic unit 600-13 of the way 1. In a stage 4, data of six words is supplied to a calculation unit 603 in a basic unit 600-24 of the way 2 and to a calculation unit 603 in a basic unit 600-14 of the way 1.

In this way, each data of one word read out from the memory block 606 of the way 0 in each of the stages 1, 2 and 3 is sent to the FIFOs 609 in the same stage where the data of one word is read out. Then, data of six words is simultaneously supplied from each stage, to a calculation unit 603 of a next stage following the each stage. In the case of stencil computation, a function of shifting instruction mapping described above is used in combination for maximized reuse of the memory blocks.

(Embodiment 3): In the Case of Caching Function

With reference to FIGS. 9 to 12, the following will discuss an operation of a data processing device 800 in the case of a caching function. The data processing device 800 successively takes an address from a reference request which is stored, by a general-purpose CPU, in an interface at the top of the data processing device 800, which reference request makes a request to refer to a memory block 606 of each basic unit 600 in the data processing device 800. Then, the data processing device 800 carries out tag comparison by using address buses of ways 3 to 0. The reference request is transmitted downward to respective stages via buffers from a stage 1, a stage 2, a stage 3 . . . in order and reference to all stages is made in a pipeline manner. From a way(s) whose tag matches, data of 4 words is read out and then transmitted downward.

Note that in each stage, all the ways are simultaneously in operation as with a general set associative cache. In a case where a cache hit occurs, the content of an entire cache line needs to be read out. When a bus width is insufficient to read out the content of the entire cache line at one time, the content of the entire cache line is read out over a plurality of cycles. In the case of the present Embodiment 3, since reading is carried out in continuous 2 cycles, a reference request is accepted once every 2 cycles. Further, in a case where a cache hit occurs subsequent to acceptance of a reference request, a latency amounts to the number of stages.

Note that since the content of an L1 cache includes the content of an L2 cache (memory block 606), a flush operation of the L1 cache always hits a corresponding L2 cache. Therefore, a constant time is required for flushing all L1 caches.

(Embodiment 4): In the Case of Graph Computation

With reference to FIGS. 9 to 12, the following will discuss an operation of a data processing device 800 in the case of a caching function. In a stage 1, adjacent vertex data is supplied to a memory block 606 in a basic unit 600-01 of a way 0 from a main storage (main memory) connected to the way 0. Note that in the case of graph computation that does not necessarily require shifting of instruction mapping, the adjacent vertex data may be read out in stage 1 while the adjacent vertex data is being supplied to the stage 1 from the main storage.

In a stage 2, conditional judgment is carried out and a request for direct reference to a main storage is made. In a case where data is transmitted from the stage 1 to a stage 3 via the stage 2, delay insertion is necessary in accordance with a latency caused by the request for direct reference to the main storage. On this account, in the stage 2, a memory block 606 in a basic unit 600-32 of a way 3 and a memory block 606 in a basic unit 600-22 of a way 2 are each used as a FIFO, so that the latency is absorbed. Then, (a) data supplied from the stage 1 to the basic unit 600-32 of the way 3 and the basic unit 600-22 of the way 2 is outputted at the same time as (b) data read out from the main storage into a basic unit 600-12 of a way 1, so that the stage 3 is supplied with the data (a) and the data (b) at the same time.

Further, in the stage 3, a transaction to the main storage is issued.

In Embodiment 4, a bus of the way 0 is used for reading out adjacent vertex data, a bus of the way 1 is used for responding to a request for direct reference to the main storage, a bus of the way 2 is used for issue of a transaction, and a bus of the way 3 is used for writing data back to a memory block. This allows for scheduling such that traffic interference is prevented when reference to the main storage is made.

Embodiment 5

FIG. 13 is a circuit diagram illustrating another basic unit 600A which makes up a data processing device in accordance with Embodiment 5 of the present invention. The basic unit 600A that makes up the data processing device in accordance with Embodiment 5 is different from the basic unit 600 that makes up the data processing device in accordance with any of the above-described Embodiments 1 to 4, in that the basic unit 600A includes a memory write broadcast bus 611 in place of the memory bus and switch group 608 and the FIFO 609 of the basic unit 600.

The basic unit 600 is configured such that the memory bus and switch group 608 supplies words aggregated by the multiplexer 607 to the FIFO 609 of that basic unit 600 and to a FIFO 609 of another basic unit that is adjacent in a horizontal direction to that basic unit 600, and the FIFO 609 in each unit is configured to put out the words in the order in which the words are written to the FIFO 609.

In the basic unit 600, the words aggregated by the multiplexer 607 is written and accumulated in the FIFO 609 of that basic unit 600 and in the FIFO 609 of the another unit that is adjacent in the horizontal direction to that basic unit 600, and at a time point when all necessary data is present in the FIFOs 609, the data is supplied to a next stage all together. This leads to a delay in supply of data to the next stage. Further, resetting the FIFO 609 causes overhead in supply of data to the next stage, and therefore similarly leads to a delay in supply of data.

On the other hand, the basic unit 600A eliminates the need for provision of the FIFO 609 and the memory bus and switch group 608 which is for supplying aggregated words to the FIFO 609. Instead of the FIFO 609 and the memory bus and switch group 608, the basic unit 600A is provided with a memory write broadcast bus 611. The memory write broadcast bus 611 is used to write the same content to memory blocks of a plurality of units adjacent to each other in the horizontal direction. This makes it possible to immediately read out data from each memory block and supply data to a next stage from the each memory block without waiting for the FIFO to be filled with data.

For example, in the basic unit 600 in the above-described Embodiment 2, each piece of data of one word is read out from a memory block 606 in a basic unit 600-01 of a way 0 in a stage 1, and sent to a FIFO 609 in a basic unit 600-21 of a way 2 and to a FIFO 609 in a basic unit 600-11 of a way 1. The piece of data of one word is sent to each of these FIFOs 609, every time one word is read out from the memory block 606. Then, when full data of 6 words is present in the each of the FIFOs 609, the data of 6 words is supplied to a next stage.

On the other hand, in the basic unit 600A, unlike in the basic unit 600, the same content is written by the memory write broadcast bus 611 to all of respective memory blocks 606 in a basic unit 600-01 of a way 0, a basic unit 600-11 of a way 1, and a basic unit 600-21 of a way 2. Further, in the basic unit 600A, data of 2 words is simultaneously read out from each of these memory blocks and data of six words in total is transmitted to a register 601 of a next stage.

The same applies to stages 2 and 3.

The present invention is not limited to the embodiments, but can be altered by a skilled person in the art within the scope of the claims. The present invention also encompasses, in its technical scope, any embodiment derived by combining technical means disclosed in differing embodiments.

Embodiments of the present invention can be also described as below. That is, a data processing device in accordance with an embodiment of the present invention includes a two-dimensional structure including basic units in a plurality of stages aligned in a vertical direction, each of the stages including basic units whose number corresponds to a number of ways such that the basic units are aligned in a horizontal direction in each of the stages, the basic units in the plurality of stages including, respectively: memory blocks each having a plurality of ports; address generators each corresponding to ports of a corresponding one of the memory blocks; calculation units; groups of data buses; calculation bus and switch groups; memory bus and switch groups; and end registers, in each one of the stages, the groups of data buses simultaneously taking pluralities of words from the memory blocks such that a number of the pluralities of words is equal to a number obtained by multiplying a number of a plurality of words by a number of ways, in each one of the stages, the calculation bus and switch groups simultaneously supplying the pluralities of words to the calculation units, in each one of the stages, the memory bus and switch groups writing, to the memory blocks, respective outputs from the calculation units, the memory blocks belonging to an identical one of the ways being connected with write buses and read buses which are connected to an external memory via one bus, (a) the data processing device concurrently (i) writing a content of the external memory to the memory blocks belonging to an identical one of the ways and (ii) reading contents of the memory blocks belonging to the identical one of the ways into the calculation units, or (b) the data processing device concurrently (i) writing contents of the calculation units into the memory blocks belonging to an identical one of the ways and (ii) reading out the contents of the memory blocks belonging to the identical one of the ways into the external memory, and in a case where a content of each of the memory blocks is read out by using a corresponding one of the address generators, the data processing device simultaneously reading out a plurality of words from the each of the memory blocks and at the same time, writing a value to a corresponding one of the end registers.

The data processing device is preferably arranged such that each of the basic units further includes: a multiplexer for aggregating, into one word, a plurality of words taken from a memory block of the each basic unit; a memory bus and switch group for simultaneously supplying the one word to FIFOs in a stage in which the plurality of words are taken; and a data path for (i) reading out a single word in a case where a content of the memory block of the each basic unit is read out by using a corresponding one of the address generators and (ii) simultaneously writing a value to FIFOs in other basic units of the stage where the single word is read out and to end registers of these other basic units; and the address generators are each used to identify a location of data stored in each of the FIFOs, and the data in the FIFOs is read out and stored in the end registers of the other basic units.

The data processing device is arranged to further include: a buffer for queuing an external memory reference request; and a data bus for supplying address information to all of the memory blocks in each of the stages, in reading out contents of the memory blocks, the data processing device (i) carrying out comparison in each of the ways in regard to matching of individual tags each specified by a field portion of an address, and (ii) reading out a plurality of words from a memory block having a matched tag, concurrently with writing a value to an end register of a corresponding one of the basic units, and in writing data to the memory blocks, the data processing device (i) carrying out comparison in each of the ways in regard to matching of individual tags each specified by a field portion of an address, and (ii) writing data to a memory block having a matched tag.

The data processing device is preferably arranged such that: each of the basic units further includes an address bus for sending out address information from a corresponding one of the address generators to the external memory connected to each of the ways; before data from the external memory arrives, by using the address generators in the basic units of one of the stages, (a) respective outputs from the calculation units and (b) data which has been stored in end registers in a preceding stage of the one stage are stored in the memory blocks in the basic units of the one stage; on arrival of the data from the external memory, contents of the memory blocks in the basic units of the one stage are read out by using the address generators; and the data having arrived from the external memory and the respective outputs from the calculation units are simultaneously written to end registers in the basic units of the one stage.

The data processing device is preferably arranged such that data is transmitted from the end registers of the basic units in one stage to the calculation units or the memory blocks of a next stage following the one stage.

The data processing device is preferably arranged such that: the buffer for queuing an external memory reference request is provided in each of the stages; the data bus for supplying address information to all the memory blocks in the each stage is additionally provided as another data bus; and the external memory reference request is successively received by a pipeline operation of a plurality of stages.

In a case where a general-purpose CPU pre-processes data and transfers the data to the data processing device and in a case where the general-purpose CPU subsequently uses a result of processing carried out by the data processing device, data sharing is necessary. The above configuration allows for such data sharing without the need for an extensive cache flush. This makes it possible to increase a processing speed.

The data processing device is preferably arranged such that each of the basic units further includes: a memory write broadcast bus for broadcasting data to be simultaneously written to each of the memory blocks; a multiplexer for aggregating, into 1 word, a plurality of words taken from the each of the memory blocks; and a data path for (i) reading out a plurality of words in a case where a content of the each of the memory blocks is read out by using a corresponding one of the address generators and (ii) writing, via the multiplexer, a value to an end register in another one of the basic units of a stage where the single word is read out.

INDUSTRIAL APPLICABILITY

An embodiment of the present invention is applicable to an accelerator in a computer system.

REFERENCE SIGNS LIST

600, 600A basic unit
601 register
603 calculation unit
604 address generator
606 memory block
607 multiplexer
609 FIFO
610 data bus
611 memory write broadcast bus
800 data processing device

The invention claimed is:

1. A data processing device comprising a two-dimensional structure including basic units in a plurality of stages aligned in a vertical direction, each of the stages including basic units whose number corresponds to a number of ways such that the basic units are aligned in a horizontal direction in each of the stages,
   the basic units in the plurality of stages including, respectively:
   memory blocks each having a plurality of ports;
   address generators each corresponding to ports of a corresponding one of the memory blocks;
   calculation units;
   groups of data buses;
   calculation bus and switch groups;
   memory bus and switch groups; and
   end registers,
   in each one of the stages, the groups of data buses simultaneously taking pluralities of words from the memory blocks such that a number of the pluralities of words is equal to a number obtained by multiplying a number of a plurality of words by a number of ways,
   in each one of the stages, the calculation bus and switch groups simultaneously supplying the pluralities of words to the calculation units,
   in each one of the stages, the memory bus and switch groups writing, to the memory blocks, respective outputs from the calculation units,
   the memory blocks belonging to an identical one of the ways being connected with write buses and read buses which are connected to an external memory via one bus,
   (a) the data processing device concurrently (i) writing a content of the external memory to the memory blocks belonging to an identical one of the ways and (ii) reading out contents of the memory blocks belonging to the identical one of the ways into the calculation units, or (b) the data processing device concurrently (i) writing contents of the calculation units into the memory blocks belonging to an identical one of the ways and (ii) reading out the contents of the memory blocks belonging to the identical one of the ways into the external memory, and
   in a case where a content of each of the memory blocks is read out by using a corresponding one of the address generators, the data processing device simultaneously reading out a plurality of words from the each of the memory blocks and at the same time, writing a value to a corresponding one of the end registers.

2. The data processing device as set forth in claim 1, wherein:
   each of the basic units further includes:
      a multiplexer for aggregating, into one word, a plurality of words taken from a memory block of the each basic unit;
      a memory bus and switch group for simultaneously supplying the one word to FIFOs in a stage in which the plurality of words are taken; and
      a data path for (i) reading out a single word in a case where a content of the memory block of the each basic unit is read out by using a corresponding one of the address generators and (ii) simultaneously writing a value to FIFOs in other basic units of the stage where the single word is read out and to end registers of these other basic units; and
   the address generators are each used to identify a location of data stored in each of the FIFOs, and the data in the FIFOs is read out and stored in the end registers of the other basic units.

3. The data processing device as set forth in claim 1, further comprising:
- a buffer for queuing an external memory reference request; and
- a data bus for supplying address information to all of the memory blocks in each of the stages,
- in reading out contents of the memory blocks, the data processing device (1) carrying out comparison in each of the ways in regard to matching of individual tags each specified by a field portion of an address, and (ii) reading out a plurality of words from a memory block having a matched tag, concurrently with writing a value to an end register of a corresponding one of the basic units, and
- in writing data to the memory blocks, the data processing device (i) carrying out comparison in each of the ways in regard to matching of individual tags each specified by a field portion of an address, and (ii) writing data to a memory block having a matched tag.

4. The data processing device as set forth in claim 1, wherein:
- each of the basic units further includes an address bus for sending out address information from a corresponding one of the address generators to the external memory connected to each of the ways;
- before data from the external memory arrives, by using the address generators in the basic units of one of the stages, (a) respective outputs from the calculation units and (b) data which has been stored in end registers in a preceding stage of the one stage are stored in the memory blocks in the basic units of the one stage;
- on arrival of the data from the external memory, contents of the memory blocks in the basic units of the one stage are read out by using the address generators; and
- the data having arrived from the external memory and the respective outputs from the calculation units are simultaneously written to end registers in the basic units of the one stage.

5. The data processing device as set forth in any one of claim 1, wherein data is transmitted from the end registers of the basic units in one stage to the calculation units or the memory blocks of a next stage following the one stage.

6. The data processing device as set forth in claim 3, wherein:
- the buffer for queuing an external memory reference request is provided in each of the stages;
- the data bus for supplying address information to all the memory blocks in the each stage is additionally provided as another data bus; and
- the external memory reference request is successively received by a pipeline operation of a plurality of stages.

7. The data processing device as set forth in claim 1, wherein each of the basic units further includes:
- a memory write broadcast bus for broadcasting data to be simultaneously written to each of the memory blocks;
- a multiplexer for aggregating, into 1 word, a plurality of words taken from the each of the memory blocks; and
- a data path for (i) reading out a plurality of words in a case where a content of the each of the memory blocks is read out by using a corresponding one of the address generators and (ii) writing, via the multiplexer, a value to an end register in another one of the basic units of a stage where the single word is read out.

* * * * *